United States Patent [19]

Glaser et al.

[11] Patent Number: 5,444,841
[45] Date of Patent: Aug. 22, 1995

[54] GRAPHICAL USER INTERFACE CONTROL FOR REPLICATING DATA FIELDS IN FORMS

[75] Inventors: Howard J. Glaser, San Jose, Calif.; Joanna M. Strain, Ford; Angus T. Tuckey-Smith, Bedhampton, both of Great Britain

[73] Assignee: International Business Machines Corporation, Armonk, N.Y.

[21] Appl. No.: 233,894

[22] Filed: Apr. 26, 1994

Related U.S. Application Data

[63] Continuation of Ser. No. 789,353, Nov. 8, 1991, abandoned.

[51] Int. Cl.⁶ ............................................. G06F 17/21
[52] U.S. Cl. .................................... 395/149; 395/159
[58] Field of Search ............... 395/145, 146, 147, 148, 395/149, 155, 156, 157, 158, 159, 160, 161, 600; 364/419.1, 419.17

[56] References Cited

U.S. PATENT DOCUMENTS

| | | | |
|---|---|---|---|
| 4,646,250 | 2/1987 | Childress | 364/518 |
| 4,658,366 | 4/1987 | Posh | 364/523 |
| 4,896,291 | 1/1990 | Gest et al. | 364/900 |
| 4,982,344 | 1/1991 | Jordan | 364/521 |
| 5,140,139 | 8/1992 | Shepard | 395/149 |
| 5,165,015 | 11/1992 | Coggins | 395/155 |
| 5,208,906 | 5/1993 | Morgan | 395/148 |

FOREIGN PATENT DOCUMENTS

0376420A2 12/1989 European Pat. Off. ...... G06F 15/21
0451485A2 2/1991 European Pat. Off. ...... G06F 15/20

OTHER PUBLICATIONS

Goodman D., "The Complete HyperCard Handbook", 1988, Bantam Books, New York, U.S.A., pp. 149-158, 151-152.

Osborn, "McWrite and McPaint", 1984, McGraw-Hill, Berkeley, Calif., U.S.A., pp. 5-10.

Research Disclosure No. 29503, No. 295, Nov. 1988, Havant GB, p. 840, "Method of Editing Panes of Displayed Window".

IBM Technical Disclosure Bulletin, vol. 32, No. 8B, Jan. 1990, New York, U.S.A., pp. 231-232, "Pre-Selection Highlighting".

Communication Cover Sheets Regarding European Search Report (5 pages).

J. D. Foley, A Van Dam, "Fundamentals of Interactive Computer Graphics", 1982.

AD/Cycle User Interface Architecture Board, IBM Corporation Programming Systems, "AD/Cycle Level 2 User Interface Supplement", Sep. 1, 1991.

Primary Examiner—Mark K. Zimmerman
Assistant Examiner—N. Kenneth Barraston
Attorney, Agent, or Firm—Baker, Maxham, Jester & Meador

[57] ABSTRACT

Disclosure is made of a menu-driven computer interface system employing a graphical user interface for the entry of text data in a data store. The system receives user inputs for controlling the graphical user interface, which interface provides a document form display including at least one data entry field for text entry. The system generates a moveable cursor or pointer in the display which is positionable in response to a first control input from a user. The system responds to a second control input from a user by replicating one or more data fields.

11 Claims, 5 Drawing Sheets

GRAPHICAL USER INTERFACE CONTROL FOR REPLICATING DATA FIELDS IN FORMS

This application is a continuation of application No. 07/789,353, filed Nov. 8, 1991, now abandoned.

BACKGROUND OF THE INVENTION

The field of the present invention is computer command interfacing and the provision of user control functionality in a data processing system. More particularly, the invention relates to that category of input/output system known as the user interface, species of which include graphical display and menu-driven command capability.

The use of graphical user interface technology to operate data processing equipment is known in the art. Commercially available graphical user interface systems include "WINDOWS" by Microsoft Corporation, and "PRESENTATION MANAGER" by International Business Machines Corporation. By the expression "graphical user interface" is meant a data input/output interface providing a graphical display, including text and associated graphics information, as opposed to a text-only display. Such systems are ideally suited and conventionally adapted for menu-driven operations. That is, they allow a user to control computer operations by selecting commands from one or more menus exhibited on a display without entering statements in alphanumeric form via a keyboard. Selections are made using a mouse or other control device that moves a pointer to an icon image in the display. An icon is a visual symbol graphics display which signifies information and function, for a menu entry. An icon is "selected" by moving a mouse-control pointer or cursor to it and pressing a button on the mouse. In the art, this is referred to as "point-and-click".

Investigation has revealed a need for a visually apparent, graphical user interface control system that would allow a user, by its activation, to create and modify highly structured form documents with one or more replicatable entry fields. Thus, where data entry into a data store is desired, structured text forms with duplicatable fields could be used to enter information into the data store and provide various views of that store. Such text forms would appear as a document and would also represent a collection of data entry fields with labels in the main work area of the window (user area). The entry fields would be organized into meaningful groups as defined by one or more applications. Modification of the number of existing entry fields and entry field groups would be required where a new application requires additional (or fewer) data items or groups of data items.

A preferred system would provide a data entry form possessing the characteristics of both dialogue boxes and text files in that users would have entry fields to specify requested data, but must be able to tailor the form by dynamically adding additional data entry fields where permitted by the application. Preferably, this control capability would be provided in a visually apparent manner, indicating to the user that data fields can be replicated and suggesting the manner in which that replication can be implemented.

SUMMARY OF THE INVENTION

The present invention is directed to a menu-driven computer interface system employing a graphical user interface for the entry of text data in a data store. The system, in a preferred aspect, is adapted to receive user inputs for controlling the graphical user interface, which interface provides a document form display including at least one data field for text entry, and at least one data field replication indicator. The system is further adapted to generate a mouse-controlled pointer in the display which is positionable in response to a first control input from a user. The system is responsive to a second control input from a user for commencing a data field replication process for replicating the data field.

Thus, it is an object of the present invention to provide a dynamically extendable data field display in an otherwise structured form document. Advantageously, this permits the customization of data input and output by enabling the user to exercise complete control over the number of data fields and data field groups.

BRIEF DESCRIPTION OF THE DRAWINGS

The foregoing and other features, objects and advantages of the invention will be apparent from the following detailed description of exemplary embodiments thereof, when read in conjunction with the accompanying drawing, in which.

DESCRIPTION OF THE PREFERRED EMBODIMENTS

Figure 1:
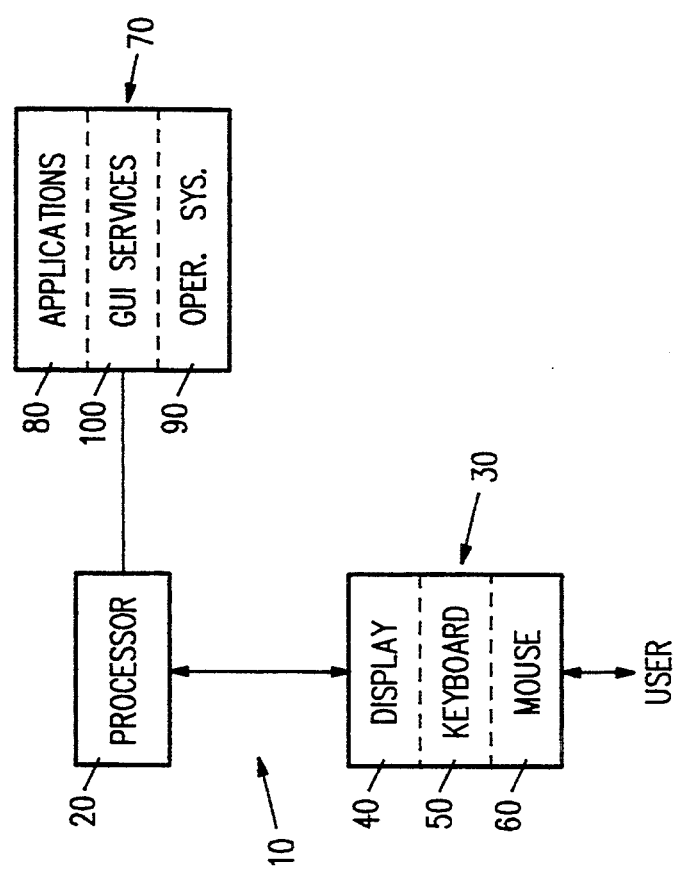
FIG. 1 is a block diagrammatic illustration of a data processing system including components for the provision of a graphic user interface in accordance with the present invention.

It will be understood and appreciated by those skilled in the art that the inventive concepts set forth herein, pertaining to the provision of an adaptive control interface in a digital processing system, may be embodied in a variety of system contexts. One such system is illustrated by way of example in FIG. 1, wherein a data processing system designated generally as 10 includes a data processing unit 20 of conventional design. An input/output system 30 is arranged in communication with the processing unit 20 and includes a video display terminal 40 with a graphics resolution of at least 1024×768 Pixels, a conventional keyboard 50, and a mouse or other cursor control device 60 with at least one input button or switch. The data processing system 10 further includes a data storage resource 70, which may include a conventional disk drive device or other storage system. The data storage resource 70 is provided with plural data storage areas incorporating an applications program module 80, an operating system 90 and a GUI (graphical user interface) data control structure 100.

The data processing unit 20 may be selected from any of a number of conventional processor devices, including, but not limited to, processors commonly found in that class of data processing apparatus known as "personal" computers or PCs. The data processing unit 20 operates in conjunction with the operating system 90 to control system hardware operations and program execution. The operating system 90 is of conventional design and may include such well-known products as the DOS or OS/2 operating systems. These operating systems are products of Microsoft Corporation and the International Business Machines Corporation.

It is contemplated that any number of commercially available applications programs may be placed in the applications program module 80, including database control programs and other software. Particular advantage may be derived when the system 10 is programmed to operate as a workstation, wherein customer or other data is input using a form display. In that case, the system 10 may be used in lieu of printed forms and manual data entry.

Control of the input/output system 30 is provided by the GUI data control structure 100, which directs operations of the data processing unit 20 in response to control signalling from the input/output system 30. In accordance with the present invention, the GUI data control structure 100 provides graphical user interface control information to the processor 20 for directing the operation of the video display terminal 40, the keyboard 50 and the mouse 60 to enable a system user to input command instructions and data to the data processing system 10.

Figure 2:
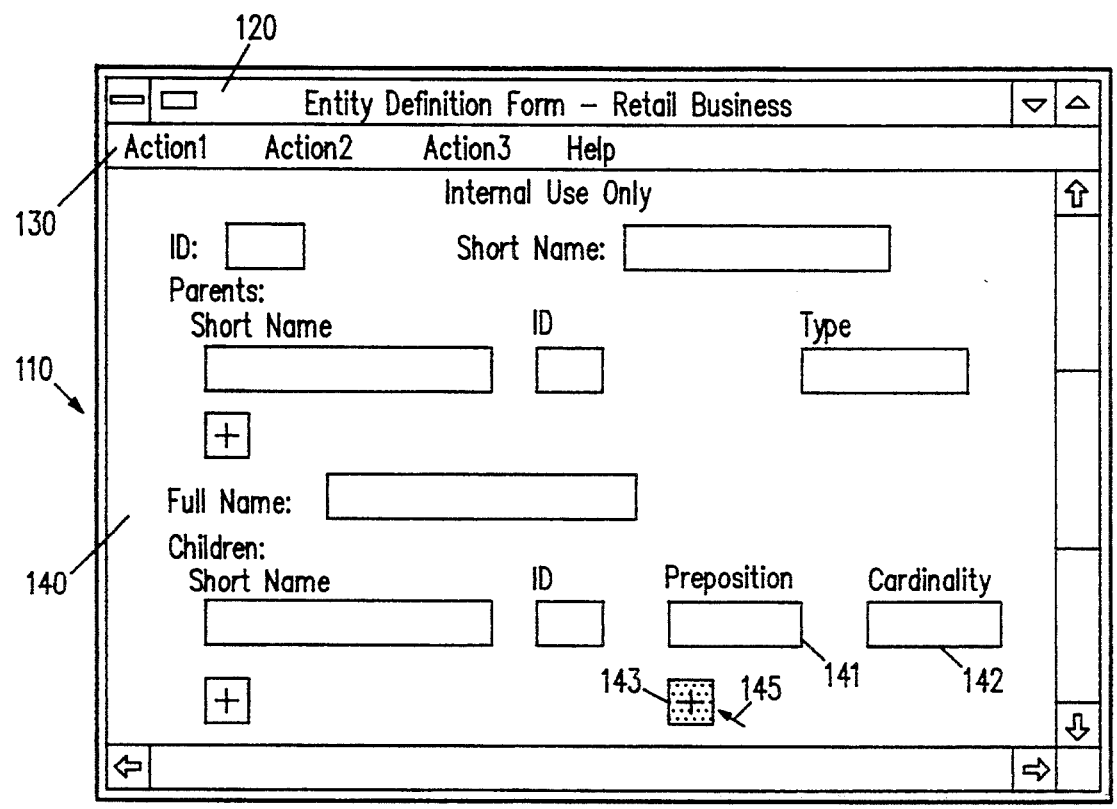
FIG. 2 illustrates a menu-driven graphical user interface display generated in accordance with the present invention including a structured form document with data entry fields and associated data descriptors, wherein several of the data entry fields is duplicatable in response to a user control input.

Referring now to FIG. 2, a document form display or window 110 generated by the GUI data control structure 100 is shown. The document display or window 110 is generated in the video display terminal 40 via control information provided by the GUI data control structure 100. The display 110 includes a title block 120 at the top of the display containing information about the application then being executed from the applications program module 30. Below the title block 120 is a command menu bar 130 including plural command menu items for inputting selected control information to the system. As is conventional, the menu bar includes one or more "Action" categories. To access a category, the user performs a conventional "point-and-click" operation using the mouse 60. That is, the user controls the mouse to position a mouse pointer icon over the desired category, and thereafter operates a button on the mouse to register the selection. When an "Action" category is choosen, a "pull-down" menu appears containing one or more commands relating to the category. These may be selectively activated using the point-and-click procedure.

The display of FIG. 2 further includes a data entry block 140. The entry block 140 has disposed therein a series of data entry fields with associated data descriptors providing various information about an individual. Each data entry field is represented by a rectangle and, preferably, is shaded differently than the display background. One data entry field is labeled "Preposition" and is denoted by reference numeral 141. The display of FIG. 2 further includes a plurality of icons in the form of "pushbuttons" disposed in the data entry block 140. The pushbuttons are represented by small rectangles with plus (+) signs therein. One pushbutton 143 is located adjacent the Preposition field 141. The pushbuttons are used for replicating data entry fields associated therewith. As discussed in more detail below, they provide a visual indication to a user that data field replication is available, and also suggest how such replication is implemented and the direction in which replication will occur.

Figure 3:
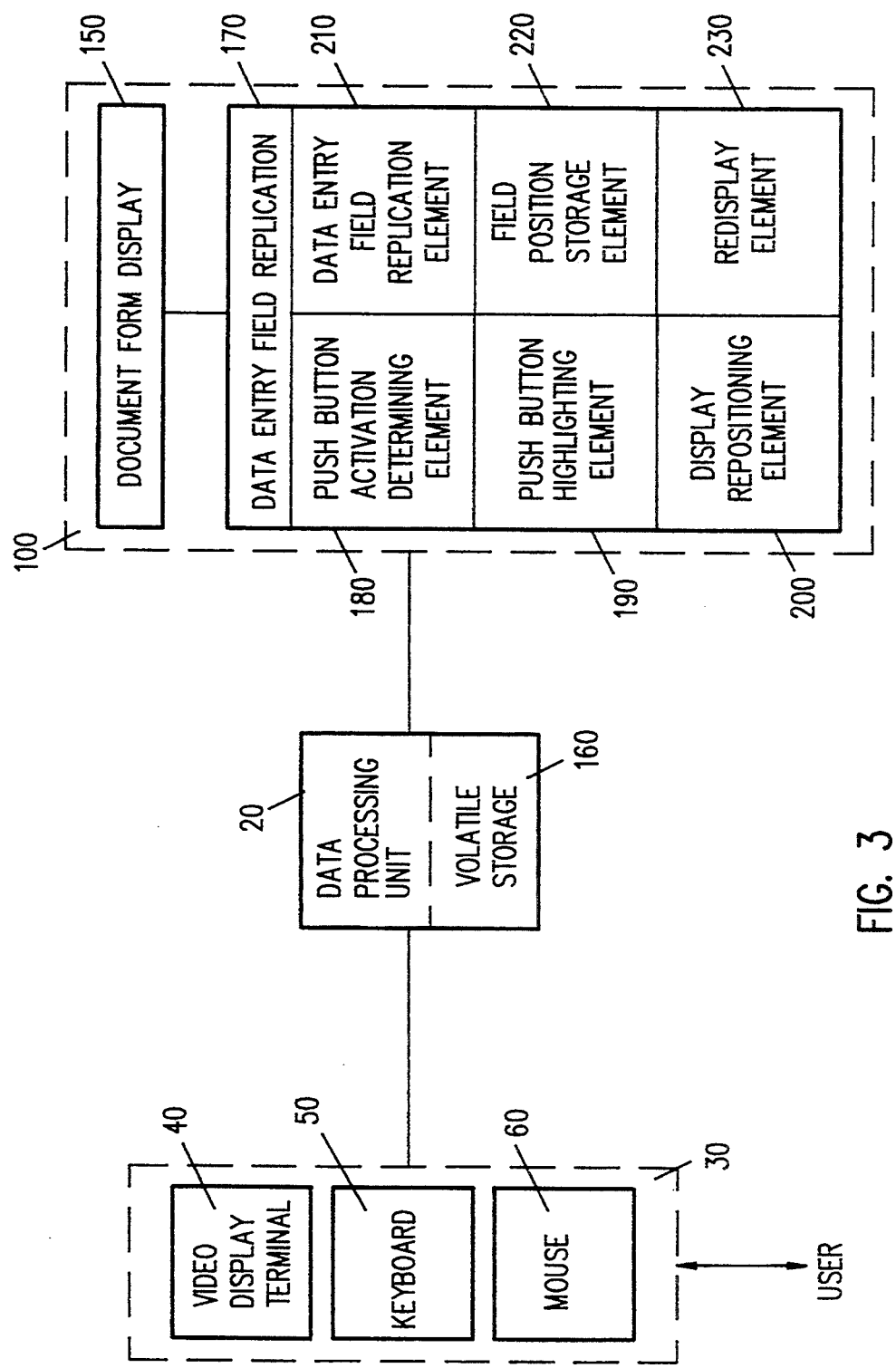
FIG. 3 is a detailed block diagram illustrating additional aspects of the system shown in FIG. 1.

Referring now to FIG. 3, the GUI data control structure 100 includes a document form display module 150. The display module 150 provides control information to the data processing unit 20 for generating a series of data objects representing components of the display of FIG. 2. This information is represented in pseudocode form in Appendix A hereto. The display code of Appendix A, which is preferably implemented using an object-oriented programming language such as SMALLTALK or C++, defines ordered collections or arrays which are used to store the position, size (dimension), type, and contents of entry fields, push buttons and labels. When the form window of FIG. 2 is generated, this data may be placed in a volatile storage device 160 associated with the processor 120, and used to refresh the display 110. The volatile storage device may include, for example, random access memory (RAM).

As shown in Appendix A, ordered collections are created for each of the labels, data entry fields and pushbuttons, as well as the Comments entry field. The labels are positioned by the column and row location of the lower left hand corner of the text string. The text string contents of the label are also specified. The entry fields and pushbuttons are positioned by the column and row location of the lower left hand corner and upper right hand corner of the rectangular box representing the entity. In addition, in the case of entry fields, single quotation marks ' ' are used to define a place holder for text entry, and letters A-D are used to define field attributes. The pushbutton arrays are defined to include a plus '+' sign image.

Figure 4:
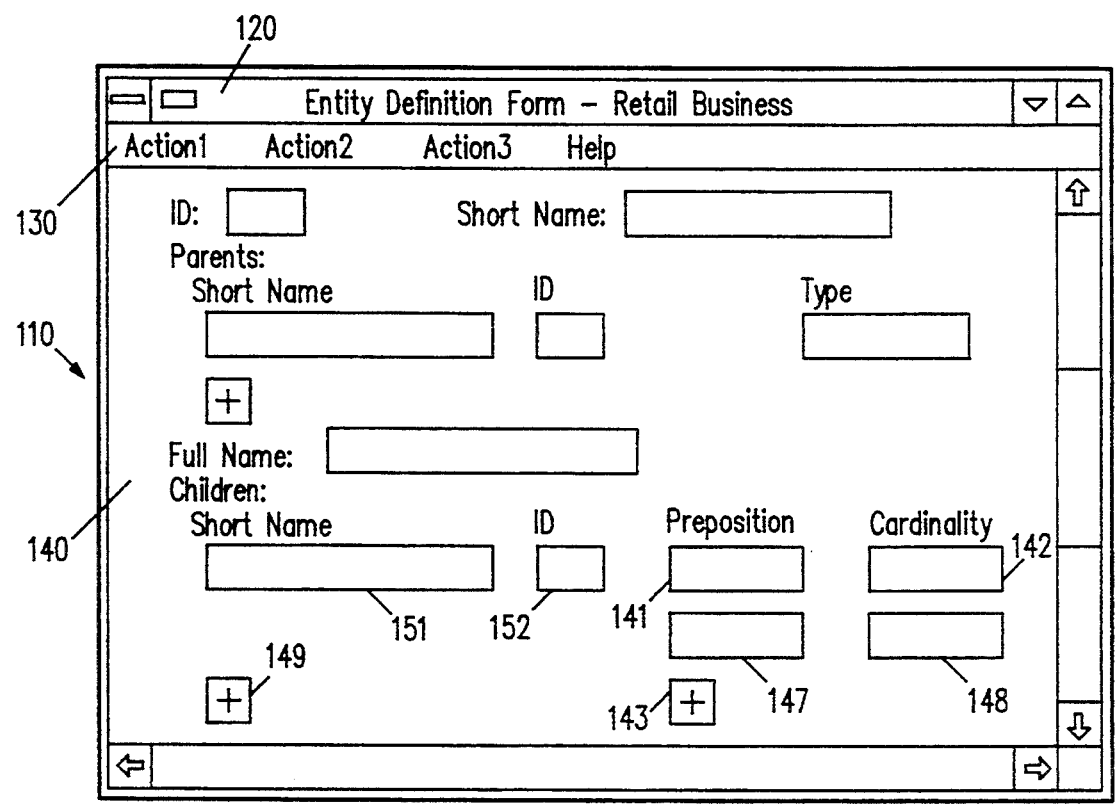
FIG. 4 illustrates the graphical user interface display of FIG. 2 in which one of the data entry fields has been replicated.
Figure 5:
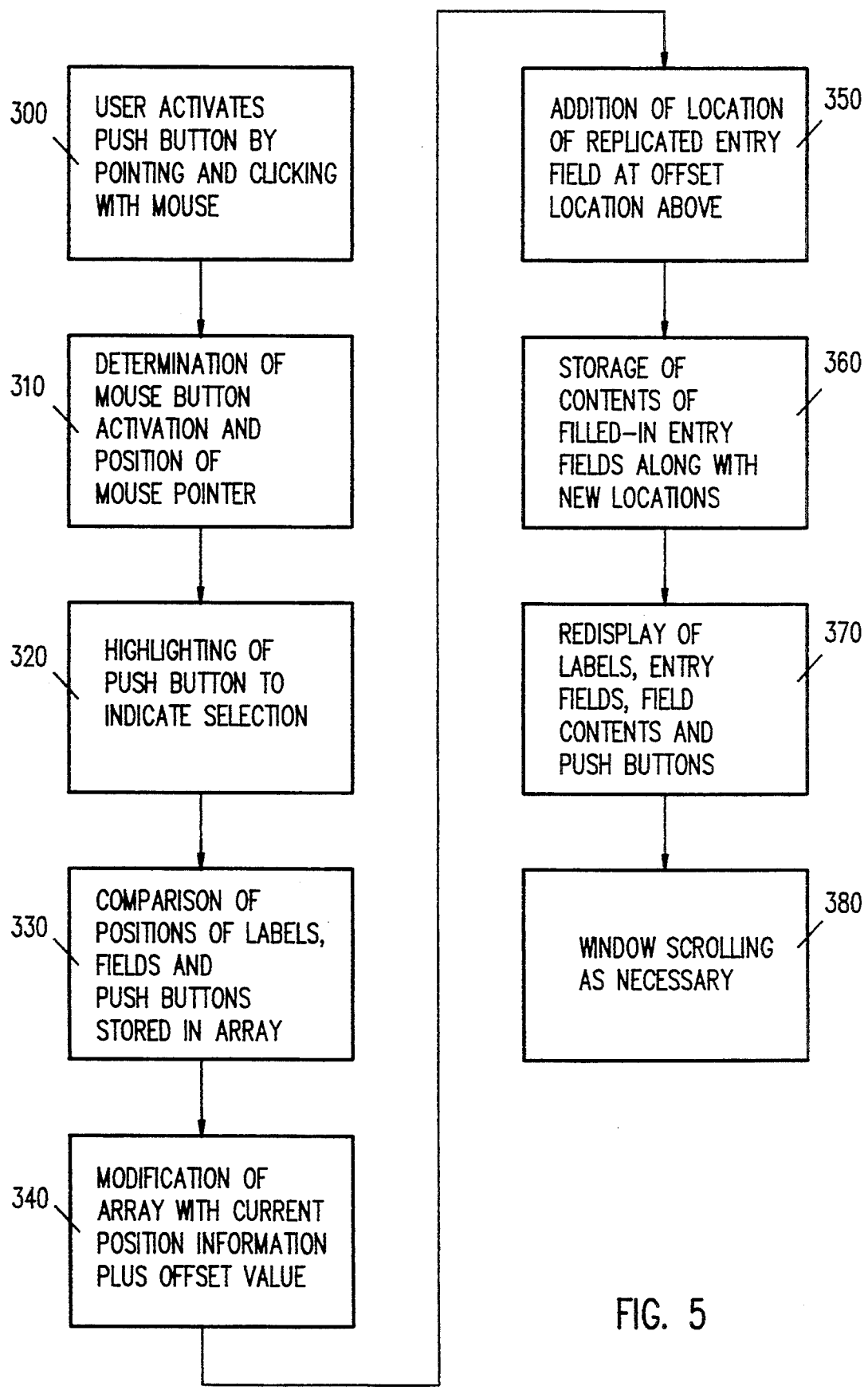
FIG. 5 is a flow diagram illustrating a process of resizing a selected data entry field in the graphical user interface display of FIG. 2.

The GUI data control structure 100 further includes a data field replication module 170. The replication module 170 includes plural process control elements. These control elements provide control information to the processor 20 to permit the replication of one or more selected data entry fields in the document display of FIG. 2, the effects of which are shown in FIG. 4. The control elements of the module 170 control the system 10 in accordance with the procedure shown in pseudocode form in Appendix B. The process by which a data entry field is caused to replicate is further shown in the flow diagram of FIG. 5.

Thus, with reference now to FIGS. 2-5, together with the pseudocode listing of Appendix B, the data entry fields bearing the data descriptors "Preposition" and "Cardinality" are shown as being selected for replication in FIG. 2. To replicate the data entry fields, the user operates the mouse 60 to position a mouse pointer 145 over the pushbutton 143 positioned adjacently below the entry fields. Replication is activated by pressing a button on the mouse. This action is illustrated at step 300 of the flow diagram of FIG. 5 and represents the commencement of execution of a data field replication operation. In the data entry field replication module 170, a pushbutton activation determining element 180 controls the processor 20 to continuously sample an input from the mouse 60 to compare the mouse pointer location with the position of entry fields and pushbuttons defined in the display. The processor 20 is controlled to determine whether the mouse pointer is within the rectangle position of a pushbutton, as described by an origin and rectangle. The control information provided by the pushbutton activation determining element 180 for the pushbutton 143 ("Button at:3") is shown in pseudocode form at line 500 of Appendix B, and is represented by process step 310 in FIG. 5. It is understood that equivalent code underlies the other pushbuttons in the data entry block 140. If the mouse pointer 145 is within the pushbutton 143, and the user has depressed a mouse button ("clicked"), a pushbutton highlighting element 190 controls the processor 20 to change the color of the pushbutton 143. The control information provided by the pushbutton highlighting element 190 is shown in pseudocode form at lines 1000-1010 of Appendix B, and is represented by process step 320 in FIG. 5.

A display repositioning element 200 controls the processor 20 to compare the postitions of the labels, entry fields and pushbuttons in the display with the position of the selected pushbutton. All display elements positioned above the selected pushbutton, including the data entry field to be replicated, are moved upwardly by adding a constant value to the row number of the object's location. The control information provided to the processor 20 by the display repositioning element 200 is shown in pseudocode form at lines 1020-1060 of Appendix B, and is represented by process steps 330 and 340 in FIG. 5.

When the display elements above the activated pushbutton are upwardly repositioned, a data entry field replication element 210 controls the processor 20 to add a new entry field, or group of entry fields, to the display. The entry fields to be replicated are determined by the application. In FIGS. 2 and 4, the activated pushbutton causes a replication of the two entry fields 141 and 142 that were above and to the right of the pushbutton in the original display. The new entry fields 147 and 148 in FIG. 4 are added to the array in a row adjacently above the pushbutton pressed. The net result, when the display is refreshed/redisplayed, is an upward shift of all items above the selected pushbutton and an insertion of new entry fields in the space provided by the shift. The control information provided by the data entry field replication element 210 is shown in pseudocode form at lines 1070-1090 of Appendix B, and is represented by process step 350 in FIG. 5.

With the addition of new entry fields, an entry field position storage element 230 controls the processor 20 to store the contents of all filled-in data entry fields repositioned as a result of the replication procedure, along with the new position locations. This information may be conveniently stored in the volatile storage device 160. The control information provided by the position storage element 220 is shown in pseudocode form at line 1100 of Appendix B, and is represented by process step 360 in FIG. 5. Thereafter, a re-display element 230 provides control information to the processor 20 to redisplay all labels, entry fields, field contents and pushbuttons in the display. The control information provided by the redisplay element 230 is shown in pseudocode form at line 1110 of Appendix B, and is represented by process step 370 in FIG. 5. The replication process is completed in accordance with process step 380 in FIG. 5 by scrolling the display window as necessary.

In accordance with the apparatus and method above, the user is provided with a form which maintains its initial structure, but which is dynamically extendable by virtue of the user's ability to replicate one or more data entry fields. Advantageously, the system allows direct manipulation by using a pointer-actuated pushbutton icon that serves both as a visual indicator that a data entry field can be replicated and as a input for replicating the entry field in an indicated direction. As shown in FIGS. 2 and 4, the direction of expansion is indicated by the placement of the pushbutton. If the pushbutton is placed below an entry field, one or more new entry fields are created and positioned downwardly from the (upwardly repositioned) initial field(s). If the pushbutton is positioned on the right side of a data field, replicated fields are added to the right of the initial field. The decision on when and where new fields should be added can be determined by application needs. In addition, pushbuttons may be positioned to replicate fields individually and in groups. Thus, whereas the pushbutton 143 shown as being activated in FIG. 2 replicates the two data fields 141 and 142 above and to the right of the pushbutton 143, and corresponding to the label "Children" activation of the lower left hand pushbutton 149 would replicate all of the four data fields 151, 152, 141 and 142 corresponding to the "Children" label. This allows the user to implement nested replications to any desired level of nesting, with each replicated data item being treated as a separate object.

In another aspect of the invention, there is provided an additional control mechanism for adding data entry fields using a pull down menu. In addition, control functionality may be further provided for deleting data entry fields added by replication (but not the initial data fields). These control functions are implemented in the display 410 of FIGS. 6 and 7. The display 410 is similar in many respects to the display 110 of FIGS. 2 and 4. The display 410 thus includes a title block 420, a command menu bar 430 and a data entry block 440. In addition, as shown in FIG. 7, a pull-down menu 450 may be activated for data field replication. To add a data entry field using a pull down menu, the user selects an entry field to be replicated by pointing to the entry field with the mouse and clicking the mouse button. This highlights the entry field. Next, the appropriate menu-bar action is selected by pointing-and-clicking. This action causes a pull-down menu to be displayed as shown in FIG. 7. Control structures highlighting selected objects and for for activating and displaying pull-down menus are conventional in the art and it will be appreciated that such structures could be readily adapted to generate the pull-down menu 450.

With the pull down menu 450 displayed, the user positions the mouse pointer to select a desired action, e.g., the "Add field" action 451, and executes that action by clicking the mouse button. Entry field duplication is then performed in accordance with the process of FIG. 5, with several exceptions. These exceptions result from the fact that the use of the menu 450 for entry field replication requires the selection of a data entry field and not a pushbutton, and because menu-based selection permits the embedding of new entry fields in an existing entry field stack. This differs from the pushbutton control method wherein new entry fields can only be added to the end of an entry field stack. Thus, in the process steps shown in FIG. 5, the use of the pull-down menu 450 for entry field replication results in the selected entry field becoming the reference point for shifting entry fields, labels and pushbuttons, rather than a selected pushbutton.

Figure 6:
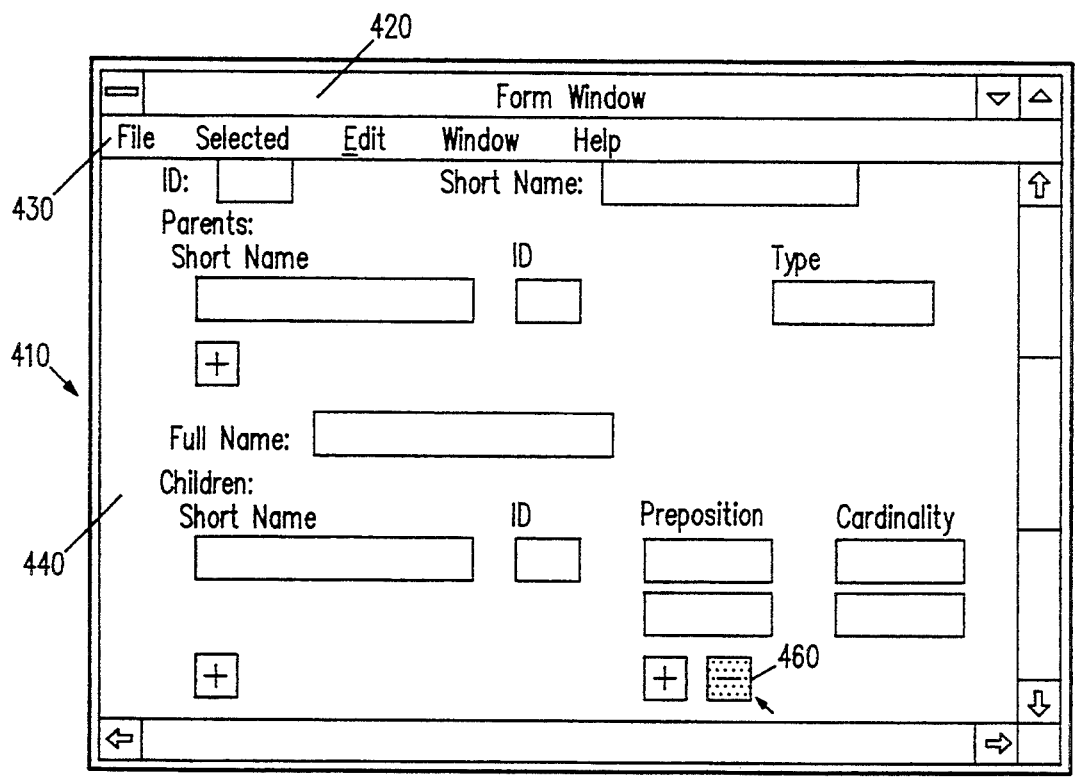
FIG. 6 illustrates a menu-driven graphical user interface display similar to that of FIGS. 2 and 4, and wherein provision is further made for eliminating duplicated entry fields in response to a user control input.
Figure 7:
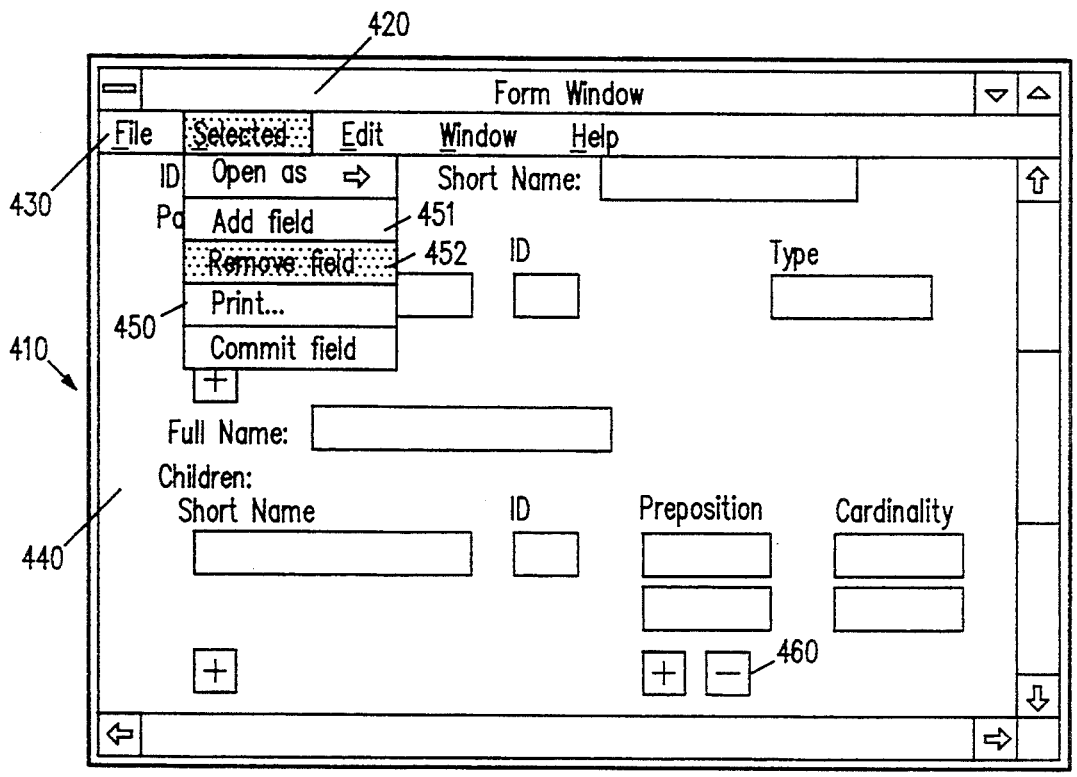
FIG. 7 illustrates a menu-driven graphical user interface as in FIG. 6, and further including a pull-down menu providing an alternative method for adding or deleting data entry fields.

Controls used to remove entry fields can be implemented by either a remove button 460 with associated minus (—) sign, as shown in FIG. 6, or by selecting and highlighting the field to be removed and requesting the "Remove field" action 452 shown in the pull-down menu 450 of FIG. 7. The pushbutton control method removes the last entry on the entry field stack while the selection method permits selecting entry fields anywhere in the stack other than the initial entry fields. In all cases, the initial entry fields are not removed. In respect to the process steps of FIG. 5, the entry field removal process works in similar fashion except that the origins for the locations of items above the deleted field are shifted downwardly by subtracting rather than adding units to the y coordinate. Advantageously, the availability of data field replication and removal functions is visually suggested by the use of plus (+) and minus (—) signs in the pushbutton images. This takes advantage of accepted "+" and "—" arithmetic convention to indicate that something can be added or taken away.

While several preferred embodiments of a graphical user interface control providing a replicatable entry field have been shown and described, it will be understood that modifications and adaptations thereof will occur to persons skilled in the art. For example, the control system provided by the GUI data control structure could be located within the applications module 80, although it is preferred that this system be located to provide input/ouput and graphical user interface services for all applications.

Thus, in view of the various modifications and adaptations likely to occur to those skilled in the art, it will be appreciated that the protection afforded the invention should not be limited except in accordance with the spirit of the following claims and their equivalents.

APPENDIX A

| | | |
|---|---|---|
| Label:= | OrderedCollection new. | /Create an ordered /collection for /labels |
| EnField:= | OrderedCollection new. | /Create an ordered /collection for entry /fields |
| Button:= | OrderedCollection new. | /Create an ordered /collection for /buttons |
| Label add: | (OrderedCollection with: 'Internal Use Only' with: (200@380)). | |
| Label add: | (OrderedCollection with: 'ID :' with (60@300)). | |
| Label add: | (OrderedCollection with: 'Short Name:' with: (220@300)). | |
| Label add: | (OrderedCollection with: 'Parents:' with: (600@270)). | |
| Label add: | (OrderedCollection with: 'Short Name' with: (100@245)). | |
| Label add: | (OrderedCollection with: 'ID' with: (270@245)). | |
| Label add: | (OrderedCollection with: 'Type' with: (360@245)). | |
| Label add: | (OrderedCollection with: 'Full Name:' with: (60@140)). | |
| Label add: | (OrderedCollection with: 'Children:' with: (60@100)). | |
| Label add: | (OrderedCollection with: 'Short Name' with: (90@80)). | |
| Label add: | (OrderedCollection with: 'ID' with: (270@80)). | |

APPENDIX A -continued

| | |
|---|---|
| Label add: | (OrderedCollection with: 'Preposition' with: (340@80)). |
| Label add: | (OrderedCollection with: 'Cardinality' with: (460@80)). |
| EnField add: | (OrderedCollection with: 90@296 with: (124@320)with: ' 'with:'A'). |
| EnField add: | (OrderedCollection with: 320@296 with: (470@320)with:' 'with:'A'). |
| EnField add: | (OrderedCollection with: 80@216 with: (230@240)with:' 'with:'B'). |
| EnField add: | (OrderedCollection with: 260@216 with: (290@240)with:' 'with:'B'). |
| EnField add: | (OrderedCollection with: 340@216 with: (420@240)with:' 'with:'B'). |
| EnField add: | (OrderedCollection with: 140@131 with: (290@155)with:' 'with:'A'). |
| EnField add: | (OrderedCollection with: 80@46 with: (230@70)with:' 'with:'C'). |
| EnField add: | (OrderedCollection with: 260@46 with: (290@70)with:' 'with:'C'). |
| EnField add: | (OrderedCollection with: 340@46 with: (440@70)with:' 'with:'D'). |
| EnField add: | (OrderedCollection with: 460@46 with: (540@70)with:' 'with:'D'). |
| Button add: | (OrderedCollection with: 80@180 with: (100@200)with:' '). |
| Button add: | (OrderedCollection with: 80@10 with: (100@30)with:' '). |
| Button add: | (OrderedCollection with: 340@20 with: (360@40)with:' '). |

APPENDIX B

| | | |
|---|---|---|
| 500 | ((Rectangle origin:((Button at:3) at:1) corner:((Button at:3) at: 2)) containsPoint: (aPane mouseLocation)) | /check to see /if graphic /pushbutton 3 /has been /pressed |
| 1000 | ifTrue:[EnField do: | |
| 1020 | [:item|(((item at:1)y) >((Button at:3) at:2)y)) | /If true, move /up position of |
| 1030 | ifTrue:[item at:1 put:((item at 1) + (0@30)). | /entry fields /above push- |
| 1040 | item at:2 put:((item at:2) + (0@30))]]]. | /button 3 by 30 /units |
| 1010 | Change color of pushbutton | /highlight /pushbutton |
| 1050 | [Label do:[:item|((item at:2)y >((Button at:3) at:2)y) | /Then move up /label posi- |
| 1060 | ifTrue:[item at:2 put:((item at:2) + (0@30)). | /tions by 30 /units |
| 1070 | EnField add: (OrderedCollection with: 340@46 with:(440@70)with: ' 'with:'G'). | /Add new entry /fields to |
| 1080 | EnField add: (OrderedCollection with: 460@46 with:(540@70)with: ' 'with:'G').]]]. | /ordered col- /lection |
| 1090 | [(Button at:1) at:1 put:((Button at:1) at:1) + (0@30)). (Button at:1) at:2 put:((Button at:1) at:2) + (0@30)]. | /Then /move up /pushbuttons /by 30 units |
| 1100 | Store contents of filled-in entry fields along with new locations | |
| 1110 | Re-display labels, entry fields, field contents and pushbuttons | |

We claim:

1. In a data processing system for providing a menu-driven graphical user interface for the display of text data, the data processing system having a data processing unit, a video display terminal, a keyboard, a cursor control device for providing control inputs to said system and a data storage resource, and the graphical user interface providing a document form display representation (document representation) on said video display terminal including at least one data field for text entry and display, a combination comprising:

pushbutton means for generating a pushbutton image in said document display adjacent to said data field, said pushbutton means being positioned to provide a visual indication of a replication direction in which said data field can be replicated;

means for generating a pointer in said document display;

means for positioning said pointer in said document display in response to a first control input from said cursor control device; and replicating means responsive to said pointer positioned at said pushbutton image and to a second control input from said cursor control device representing a data field replicating command for replicating said data field in said document representation.

2. The combination of claim 1 further including means for modifiying a color of said pushbutton image in response to said pointer positioned at said pushbutton image.

3. The combination of claim 1 wherein said display includes plural display elements and said system further includes means responsive to replication of said data field for repositioning one or more of said display elements previously positioned in a predetermined direction from said pushbutton image, said predetermined direction being opposite to said replication direction.

4. The combination of claim 3 further including means responsive to replication of said data field for storing positions of said one or more display elements.

5. The combination of claim 4 further including means responsive to the storage of said positions for displaying said display elements at corresponding positions in said document representation.

6. The data processing system of claim 1 wherein said data field is for displaying text data to be input in a data store, and further wherein there are plural data fields and plural pushbutton means associated with individual ones or groups of said plural data fields.

7. A menu-driven graphical user interface control system for the entry of text data in a data store, comprising:

input means for receiving user-selected control inputs;

display means for producing the display of a document representation having at least one data field for the entry of data in a data store;

pushbutton means for producing the display of a pushbutton image in said document representation adjacent said data field, said pushbutton means being positioned to provide a visual indication of a replication direction in which said data field can be replicated;

pointer means for producing the display of a pointer image in said document representation;

positioning means for positioning said pointer in said document representation in response to a first control input; and replicating means responsive to said pointer positioned at said pushbutton image and to a second control input representing a data field replicating command for replicating said data field in said document representation.

8. The control system of claim 7 further including means for changing a color of said pushbutton image in response to said pointer positioned at said pushbutton image.

9. The control system of claim 7 wherein said document representation includes plural display elements and said system further includes means responsive to replicating said data field for repositioning one or more of said display elements previously positioned in a predetermined direction from said pushbutton image, said predetermined direction being opposite to said replication direction.

10. The control system of claim 9 further including means responsive to replicating said data field for storing positions of said repositioned display elements.

11. The control system of claim 10 further including means responsive to the storage of said repositioned display elements for displaying said display elements at corresponding positions in said document representation.

* * * * *